(12) United States Patent
Huang et al.

(10) Patent No.: US 7,068,711 B2
(45) Date of Patent: Jun. 27, 2006

(54) MULTI-FUNCTION EQUALIZER ARRANGEMENT

(75) Inventors: Gang Huang, Highlands, NJ (US); Zhenyu Wang, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 753 days.

(21) Appl. No.: 10/097,902

(22) Filed: Mar. 13, 2002

(65) Prior Publication Data

US 2003/0174761 A1 Sep. 18, 2003

(51) Int. Cl.
*H04M 9/08* (2006.01)
*H04L 1/38* (2006.01)
(52) U.S. Cl. .................. 375/219; 379/406.01; 375/232
(58) Field of Classification Search ................ 375/229, 375/219, 230, 232, 233; 379/406.01
See application file for complete search history.

(56) References Cited

U.S. PATENT DOCUMENTS

| | | | |
|---|---|---|---|
| 5,481,564 A * | 1/1996 | Kakuishi et al. ............. | 375/230 |
| 5,526,377 A * | 6/1996 | Yedid et al. ................. | 375/229 |
| 5,841,809 A * | 11/1998 | Koizumi et al. ............. | 375/233 |
| 6,430,287 B1* | 8/2002 | Rao ...................... | 379/406.08 |
| 2002/0003835 A1* | 1/2002 | Wu ............................ | 375/219 |
| 2002/0057790 A1* | 5/2002 | Duttweiler et al. ..... | 379/406.01 |

* cited by examiner

*Primary Examiner*—Kevin Burd

(57) ABSTRACT

A data communication transceiver comprises an equalizer that is operable to selectively participate in one of several different signal processing functions in the transceiver. In a disclosed embodiment the equalizer operates in an echo canceller when the transceiver is transmitting signals, and operates in a feedback equalizer when the transceiver is not transmitting signals.

22 Claims, 2 Drawing Sheets

MULTI-FUNCTION EQUALIZER ARRANGEMENT

BACKGROUND OF THE INVENTION

The present invention relates to data communications and, in particular, to circuit arrangements that may be used in data communication transceivers, such as transceivers that may be used in carrier sense multiple access ("CSMA") networks.

In CSMA networks, where a plurality of data communication transmitter/receiver devices ("transceivers") share a communication medium or channel, it is often necessary to detect collision events. A collision occurs when there is simultaneous transmission of signals by two or more devices. In a well-controlled medium with baseband signaling, such as Ethernet, a collision can be detected simply by monitoring whether the average voltage level is out of a normal range. In media that are not well-controlled, such as residential telephone lines and transmission systems employing QAM modulation, such a method is ineffective because the average signal level is always near zero, with or without collision, and the relative signal levels between colliding transceivers can differ significantly, making collision detection difficult.

BRIEF SUMMARY OF THE INVENTION

The present invention provides new methods and apparatus that may be used in data communication transceivers.

In one embodiment, the present invention is an arrangement for use in a data communication transceiver, the arrangement comprising an equalizer that is operable to selectively participate in one of several different signal processing functions in the transceiver.

In another embodiment, the present invention is a method of operating a data communication transceiver having an equalizer comprising the steps of selectively operating the equalizer in an echo canceller when the transceiver is transmitting signals, and operating the equalizer in a feedback equalizer when the transceiver is not transmitting signals.

BRIEF DESCRIPTION OF THE DRAWINGS

The foregoing and other aspects, features, and advantages of the present invention will become more fully apparent from the following detailed description, the appended claims, and the accompanying drawings in which:

DETAILED DESCRIPTION

The signal representations in the figures and description are in complex form, i.e., with real and imaginary parts. It should be clear to those skilled in the art how the operations described herein may be carried out in signal processing hardware.

Figure 1:
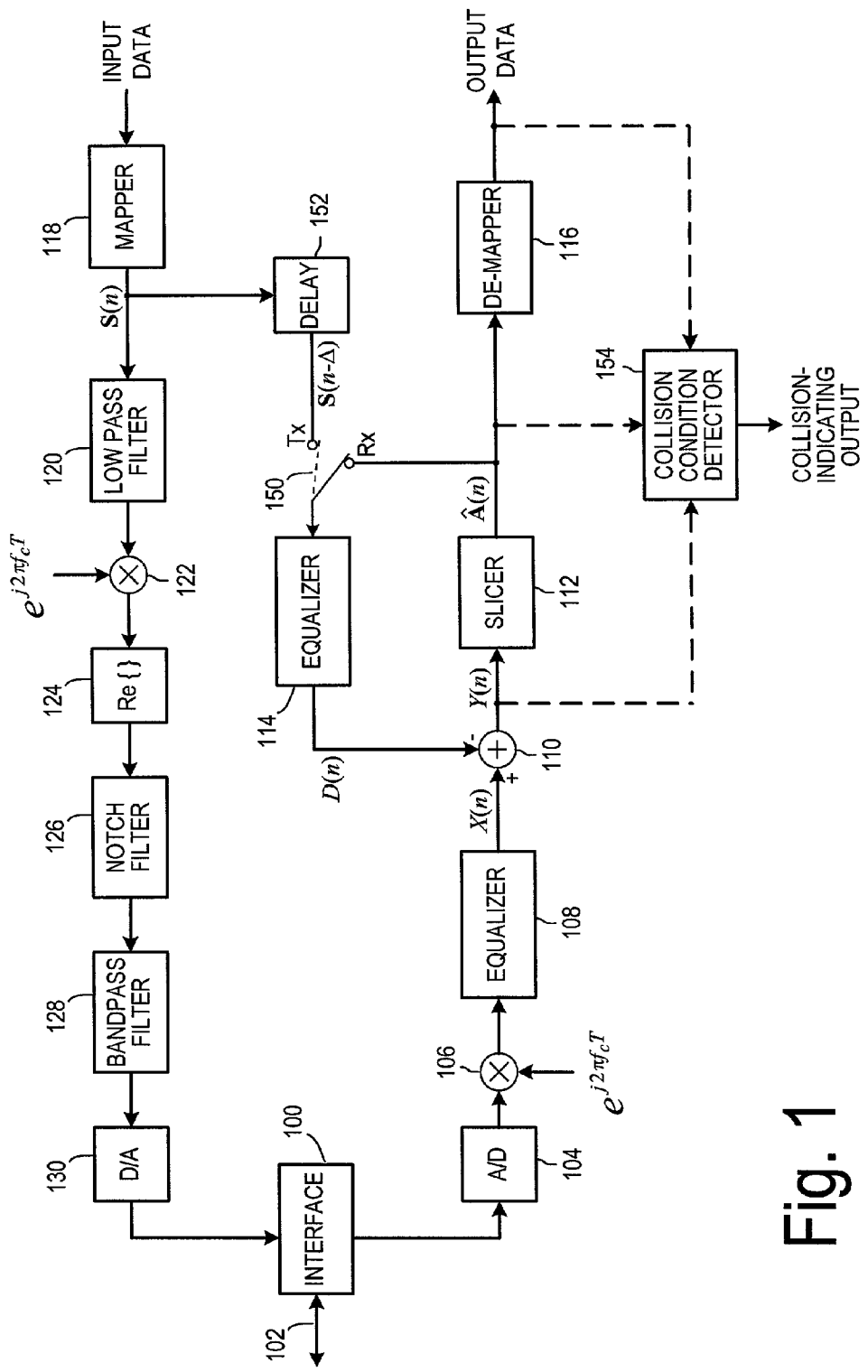
FIG. 1 is a schematic diagram illustrating an example of a data communication transceiver in accordance with the present invention.

FIG. 1 is a schematic diagram illustrating an example of a data communication transceiver in accordance with the present invention. The transceiver includes an interface 100 to a communication channel 102. The transceiver includes transmitter circuitry that processes input data signals and supplies the processed signals to interface 100, which couples them to communication channel 102 for transmission to other data communication devices. The transceiver includes receiver circuitry that processes signals that are coupled to it by interface 100 from communication channel 102 to generate output data signals. In the transceiver example of FIG. 1, the transmitter circuitry is represented by blocks 118–130, and the receiver circuitry is represented by blocks 104–116, the operation of which is discussed below. Signals occurring in transmitter circuitry may be referred to herein as "transmitter signals," and signals occurring in receiver circuitry may be referred to herein as "receiver signals."

In the transceiver example of FIG. 1, input data to be transmitted by the transceiver is mapped to symbols by mapper 118, which symbols are filtered by low-pass filter 120. Modulator 122 modulates a carrier signal, having a carrier frequency $f_c$, with the filtered symbols. The modulated carrier is filtered by real part extractor 124, by notch filter 126, and by band-pass filter 128, the filtered modulated carrier is converted to analog signals for transmission by digital-to-analog ("D/A") converter 130, and the resulting analog signals are coupled to communication channel 102 by interface 100. Signals received by the transceiver from interface 100 are digitized by analog-to-digital ("A/D") converter 104, demodulated by demodulator 106, and equalized by equalizer 108 (which may be a fractionally-spaced linear equalizer operating as a feed-forward equalizer). The output of equalizer 108, X(n), is combined with the output of equalizer 114, D(n), by combiner 110. The output of combiner 110, Y(n), is sliced by slicer 112, and the sliced symbols output by slicer 112, Â(n), are mapped to output data by de-mapper 116.

In a CSMA network, simultaneous transmission by more than one transceiver is not an intended normal operating condition; that is, although it is expected that transmissions by several transceivers may by chance occur simultaneously, such occurrence is treated as an error condition, in response to which a transceiver detecting a collision may abort its transmission. Accordingly, a transceiver for use in a CSMA network may operate in two modes: a receive mode, and a transmit mode. In the receive mode, the transceiver does not transmit signals to communication channel 102, and it does process signals received from communication channel 102 to determine their data content. In the transmit mode, the transceiver transmits signals to communication channel 102, but it need not process signals received from communication channel 102 to determine their data content, because such signals received while the transceiver is transmitting are colliding signals.

In a prior art data communication transceiver, an equalizer 114 is configured as a feedback equalizer, receiving as its input a receiver signal such as Â(n). Such an equalizer 114 is included in a prior art transceiver principally for use in processing signals received from communication channel 102 to remove the post cursor of intersymbol interference; it does not participate in signal processing associated with transmitter signals, such as cancellation of echoes of transmitter signals. In accordance with a broad aspect of the invention, an equalizer is operable to selectively perform one of several functions in a transceiver. In accordance with more particular aspects of the invention, the several functions that may be selectively performed by an equalizer include feedback equalization and echo cancellation. In accordance with another aspect of the present invention, collision detection in a transceiver includes detection of a non-echo component in a receiver signal, such as may be effected using a multi-function equalizer arrangement operating as an echo canceller.

In embodying the above-referenced aspects of the present invention, the transceiver of FIG. 1 includes selector 150, delay element 152, and collision condition detector 154. Selector 150 selects one of a plurality of signals to be supplied as an input of equalizer 114. Selector 150 is illustrated as a switch that can assume a transmit ("Tx") position or a receive ("Rx") position in order to select one of several signals. The transmit position and the receive position of selector 150 correspond to a transmit mode and a receive mode, respectively, of the transceiver. In the receive position, selector 150 selects the output of slicer 112 as the input to equalizer 114, and in that configuration equalizer 114 operates conventionally as a decision feedback equalizer.

In the transmit position, selector 150 selects the output of delay element 152 as the input of equalizer 114, and in that configuration equalizer 114 operates as a part of an echo canceller. The input of delay element 152 is the stream of symbols S(n) generated by mapper 118 for transmission, and the output of delay element 152 is a symbol stream S(n−Δ) that is slightly delayed with respect to the transmission symbol stream S(n). The output of equalizer 114, D(n), is a delayed and equalized analogue of the transmission symbol stream S(n) generated by mapper 118.

When the transmitter circuitry processes signals and when transmitter signals are coupled through interface 100 to communication channel 102, coupling and reflections in the transceiver components and communication channel 102 can give rise to echo signals that appear in and are processed by receiver circuitry. Echo cancellation is typically performed by a full-duplex transceiver to reduce the echoes of its own transmissions in order to improve its processing of signals received from other transceivers. Echo cancellation typically involves generating an estimate of a signal that will appear at a particular point in a receiver due to echoes of transmitter signals, and removing the echo estimate from the receiver signal at that point. In the transceiver of FIG. 1, if the signal processing of the transmission symbol stream provided by delay element 152 and equalizer 114 matches the signal processing of the transmission symbol stream that results in an echo component of signal X(n), then signal D(n) cancels the echo component of signal X(n), and the portion of output Y(n) of combiner 110 due to echo of transmitter signals is zero.

If signal D(n) is a perfectly accurate estimate of the echo component of signal X(n), then a nonzero output Y(n) of combiner 110 during transmission by the transceiver must be caused by something other than echo, and a nonzero Y(n) may be assumed to be the result of a colliding signal transmitted by another transceiver. Colliding signals are not usually a problem in full-duplex communications over a common channel, because full-duplex systems are designed to operate with simultaneous signaling by several transceivers. However, transceivers for CSMA networks may require collision detection. In accordance with another aspect of the present invention, collision detection includes detection of a non-echo component in a receiver signal.

The system of FIG. 1 includes collision condition detector 154. Collision condition detector 154 is provided with an input signal that is responsive to the occurrence of a collision condition, and it processes such input signal to provide a collision-indicating output indicating the occurrence of a collision. Preferably, collision condition detector 154 processes such input signal by comparing it with a reference that is deemed to correspond to a collision condition (or, equivalently, to a non-collision condition). The nature of the reference will depend on, among other things, the selected input to collision condition detector 154. FIG. 1 illustrates, by dashed arrows, three alternative collision-information-containing signals that may be supplied as an input to collision condition detector 154.

One signal that may be used as the input to collision condition detector 154 is Y(n). If there is no receiver input other than an echo signal, and if the estimated echo signal D(n) is a perfect estimate of the signal X(n) caused by echo, then the output Y(n) of combiner 110 will be zero, and zero may be selected as the reference for comparison with Y(n). Under such circumstances, a zero Y(n) may be deemed a non-collision condition, a nonzero Y(n) may be deemed a collision condition, and collision condition detector 154 may be configured to discriminate between zero and nonzero conditions of Y(n) and to generate an output indicating a collision in response to a nonzero Y(n) occurring while the transceiver is transmitting. However, factors such as inexactness of the estimated echo signal D(n) and noise in communication channel 102 may result in a nonzero combiner 110 output signal Y(n) even in the absence of a colliding signal. To account for such effects, the reference to which collision condition detector 154 compares Y(n) may be an appropriate nonzero threshold, and collision condition detector 154 may generate a collision-indicating output based on such comparison.

Other collision-responsive signals that may be used as an input to collision condition detector 154 include other signals derived from or responsive to Y(n). Another signal shown in FIG. 1 that may be used as an input to collision condition detector 154 is Â(n), which is the symbol output of slicer 112; in that case, collision condition detector 154 may compare Â(n) with an appropriate threshold, and generate a collision-indicating output if Â(n) exceeds the threshold. Another signal shown in FIG. 1 that may be used as an input to collision condition detector 154 is the output data to which Â(n) is mapped by de-mapper 116; in that case, collision condition detector 154 may compare such output data with a reference comprising a set of data deemed to correspond to a collision condition, and generate a collision-indicating output based on the comparison. It should be understood that other collision-information-containing signals may exist in specific implementations of a system in accordance with FIG. 1, or in other transceivers that utilize the present invention but that differ from the system of FIG. 1 in their other processing methods and elements. The specific function of collision condition detector 154 chosen for use in a particular application will no doubt depend on the collision-information-containing signal selected as its input and the condition in that input that is deemed to correspond to the existence of a collision.

Figure 2:
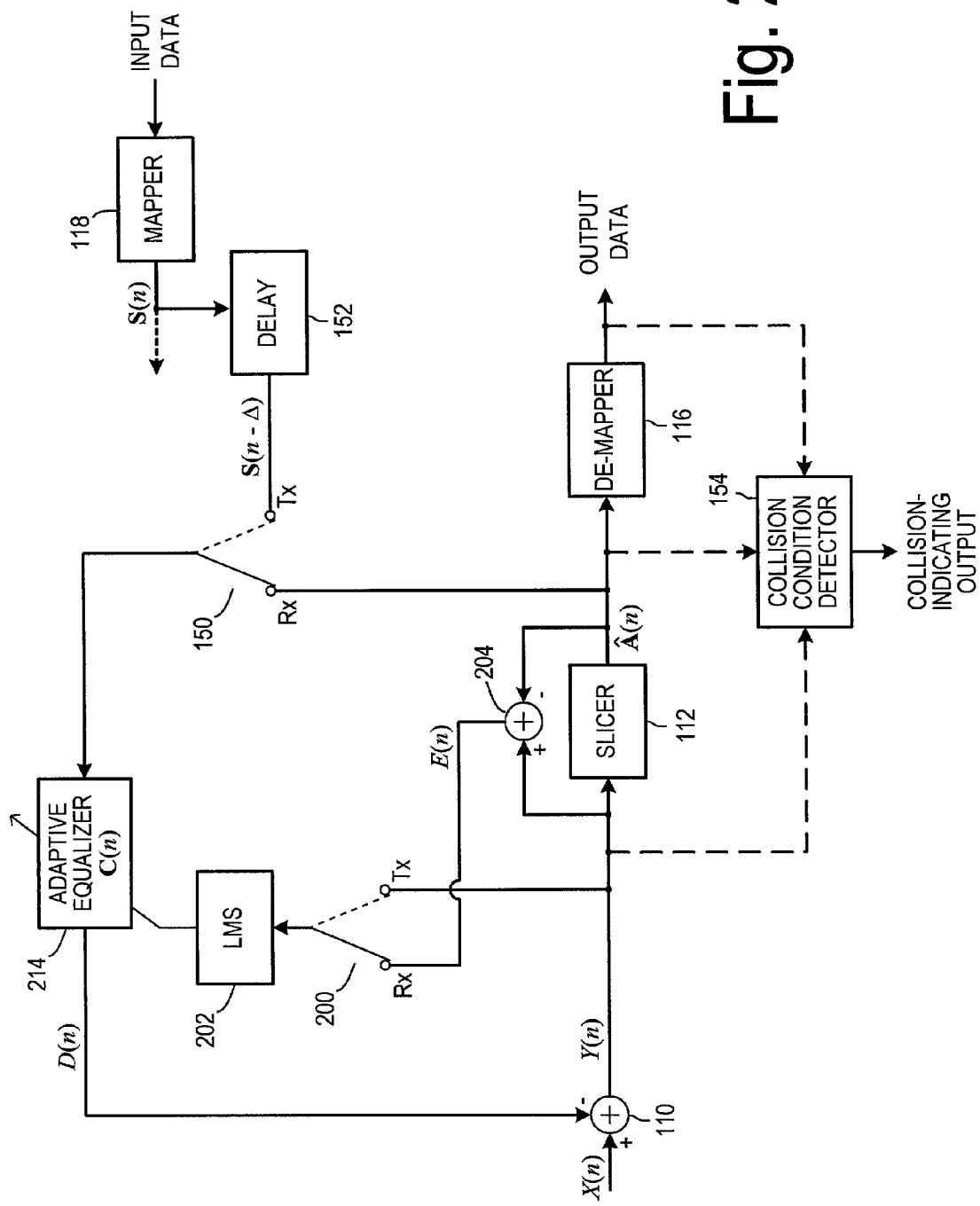
FIG. 2 is a schematic diagram illustrating a preferred embodiment of the multi-function equalizer arrangement of FIG. 1.

FIG. 2 is a schematic diagram illustrating a preferred embodiment of the multi-function equalizer arrangement of FIG. 1. Elements in FIG. 2 that are the same as those in FIG. 1 are indicated by the same reference numerals. The preferred equalizer is adaptive equalizer 214, which processes its input (as selected by selector 150) in a filter having tap coefficients C(n). The tap coefficients C(n) are updated by an adaptation process that is illustrated in the preferred embodiment of FIG. 2 as least mean square ("LMS") element 202, which may be implemented as an algorithm operating in an appropriate processing element. The adaptation process illustrated receives different inputs in the transmit mode and the receive mode according to the Tx and Rx positions, respectively, of adaptation input selector 200.

In the receive mode, the adaptive equalizer 214 operates as a decision feedback equalizer and the adaptation process minimizes the mean squared error E(n), which is generated by combiner 204 as the difference between the input Y(n) and output Â(n) of slicer 112. A preferred algorithm for updating the tap coefficients C(n) in the receive mode is $$C(n+1)=C(n)+\beta E(n)\hat{A}(n)$$

where $C(n)=[c_1(n) \ldots c_N(n)]^T+j[d_1(n) \ldots d_N(n)]^T$ is the complex coefficient vector of the filter,
$\hat{A}(n)=[\hat{a}(n) \ldots \hat{a}(n-N+1)]^T+j[\hat{b}(n) \ldots \hat{b}(n-N+1)]^T$ is the vector of the sliced complex symbol,
$E(n)=e_I(n)+je_Q(n)$ is the complex error value, and
β is the adaptation step size.

In the transmit mode, the adaptation process minimizes the difference Y(n) between the echo-containing received signal X(n) and the estimated echo D(n). A preferred algorithm for updating the tap coefficients C(n) in the transmit mode is $$i\ C(n+1)=C(n)+\beta Y(n)S(n-\Delta)$$

where S(n−Δ) is the complex vector of the symbols to be transmitted delayed by Δ symbol periods, and
Y(n)=X(n)−D(n) is the complex input signal to slicer 112, and is the difference between the echo-containing received signal X(n) and the estimated echo signal D(n).

In the receive mode, in the absence of a colliding signal, the arrangement of FIG. 2 can generate an echo estimate D(n) that substantially equals and cancels an echo signal X(n). However, in the presence of a colliding signal, the arrangement of FIG. 2 attempts to generate a signal D(n) that substantially equals and cancels a signal X(n) that includes both a colliding signal and an echo signal. As a general matter, an arbitrary colliding signal cannot be canceled by an arbitrary equalized transmitter signal, and so the adaptation process of FIG. 2 leaves a residual signal Y(n) during a collision notwithstanding its operation that attempts to minimize Y(n). In the process of attempting to minimize Y(n) in the presence of a colliding signal, the tap coefficients C(n) may be updated in a way that produces a signal D(n) that does not completely or even substantially cancel the echo component of the receiver signal X(n). This is not a problem in the arrangement of FIG. 2, because it relies on a nonzero Y(n) (or other signals derived from or responsive to Y(n)) to effect collision detection. However, it should be understood that as used herein, echo cancellation refers to a process that tends to reduce the effects of echo components in a receiver signal, such as a process that subtracts a transmitter-related signal from a receiver signal, and an echo canceller refers to a circuit arrangement that can perform such echo cancellation. As used herein, these terms are not limited to processes and circuits that substantially or completely cancel echoes.

The present invention can enable simplification of transceiver circuitry, since little additional circuitry beyond that already present for other functions is required to implement echo cancellation and collision detection. The present invention permits an equalizer that already exists in a transceiver but is inactive or unneeded during transmission by the transceiver, such as an equalizer providing feedback equalization of received signals in a CSMA network transceiver, to participate in echo cancellation and collision detection during transmission. The present invention may be used in transceivers operating in a CSMA environment, including HomePNA transceivers, powerline networking transceivers, and transceivers communicating over residential telephone lines. Although the invention has been illustrated in the context of particular transmitter circuitry and receiver circuitry, it should be understood that the invention may be used in transceivers having a wide variety of transmitter circuitry and receiver circuitry. As used herein, the terms "transmitter circuitry" and "receiver circuitry" include all arrangements of electronic devices that are operable as described. Such circuitry may include discrete circuitry and/or integrated circuitry, and may include dedicated-function circuitry and/or circuitry operated by stored programs, such as general-purpose processing elements executing software.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A data communication transceiver comprising:
   transmitter circuitry that processes transmitter signals,
   receiver circuitry that processes receiver signals, and
   an equalizer that is selectively operable:
   (a) in an echo canceller cancelling transmitter signals during intervals when the transceiver transmits signals, and
   (b) in a feedback equalizer equalizing receiver signals during intervals when the transceiver does not transmit signals.

2. The invention of claim 1, wherein the echo canceller generates estimated echo signals when the transceiver transmits signals.

3. The invention of claim 2, wherein the transceiver includes a combiner having an output that is responsive to the difference between a receiver signal and the estimated echo signal when the transceiver transmits signals.

4. The invention of claim 1, wherein the echo canceller includes a delay element having an input coupled to the transmitter circuitry and an output coupled to the equalizer.

5. The invention of claim 1, wherein the equalizer is an adaptive equalizer.

6. The invention of claim 5, wherein the adaptive equalizer includes a filter having tap coefficients C(n) that, when the adaptive equalizer is operating in the echo canceller, are updated in accordance with $$C(n+1)=C(n)+\beta Y(n)S(n-\Delta)$$

where
   $C(n)=[c_1(n) \ldots c_N(n)]^T+j[d_1(n) \ldots d_N(n)]^T$ is a complex coefficient vector of the filter at time n,
   S(n−Δ) is the complex vector of symbols to be transmitted delayed by Δ symbol periods,
   β is an adaptation step size, and
   Y(n) is the difference between an echo-containing received signal and an estimated echo signal.

7. The invention of claim 5, wherein the receiver circuitry includes a slicer having an input and an output and wherein the adaptive equalizer includes a filter having tap coeffi cients C(n) that, when the equalizer is operating in the feedback equalizer, are updated in accordance with $$C(n+1)=C(n)+\beta E(n)\hat{A}(n)$$

where
- $C(n)=[c_1(n) \ldots c_N(n)]^T+j[d_1(n) \ldots d_N(n)]^T$ is a complex coefficient vector of the filter at time n,
- $\hat{A}(n)=[\hat{a}(n) \ldots \hat{a}(n-N+1)]^T+j[\hat{b}(n) \ldots \hat{b}(n-N+1)]^T$ is a vector of a sliced complex symbol at the slicer output,
- $E(n)=e_I(n)+je_Q(n)$ is a complex error value between the slicer input and slicer output, and
- β is an adaptation step size.

8. The invention of claim 1, wherein the transceiver further comprises a collision condition detector that is responsive to the echo canceller.

9. The invention of claim 1, wherein the receiver circuitry includes a slicer having an input and an output, the echo canceller generates estimated echo signals when the transceiver transmits signals, the transceiver includes a combiner having an output that is responsive to the difference between a receiver signal and the estimated echo signal when the transceiver transmits signals, the echo canceller includes a delay element having an input coupled to the transmitter circuitry and an output coupled to the equalizer, the transceiver includes a collision condition detector that is responsive to the echo canceller, the equalizer is an adaptive equalizer that includes a filter having tap coefficients C(n) that, when the adaptive equalizer is operating in the echo canceller, are updated in accordance with $$C(n+1)=C(n)+\beta Y(n)S(n-\Delta)$$

where
- $C(n)=[c_1(n) \ldots c_N(n)]^T+j[d_1(n) \ldots d_N(n)]^T$ is a complex coefficient vector of the filter at time n,
- $S(n-\Delta)$ is the complex vector of symbols to be transmitted delayed by Δ symbol periods,
- β is an adaptation step size, and
- Y(n) is the difference between an echo-containing received signal and an estimated echo signal, and, when the equalizer is operating in the feedback equalizer, are updated in accordance with $$C(n+1)=C(n)+\beta E(n)\hat{A}(n)$$

where
- $C(n)=[c_1(n) \ldots c_N(n)]^T+j[d_1(n) \ldots d_N(n)]^T$ is a complex coefficient vector of the filter at time n,
- $\hat{A}(n)=[\hat{a}(n) \ldots \hat{a}(n-N+1)]^T+j[\hat{b}(n) \ldots \hat{b}(n-N+1)]^T$ is a vector of a sliced complex symbol at the slicer output,
- $E(n)=e_I(n)+je_Q(n)$ is a complex error value between the slicer input and slicer output, and
- β is an adaptation step size.

10. The invention of claim 1, wherein:
when the transceiver transmits signals, the equalizer is configured to receive an input signal from the transmitter circuitry to operate in the echo canceller; and
when the transceiver does not transmit signals, the equalizer is configured to receive an input signal from the receiver circuitry to operate in the feedback equalizer.

11. An arrangement for use in a data communication transceiver, the arrangement comprising an equalizer that is operable to selectively participate in one of several different signal processing functions in the transceiver, wherein:

the arrangement further comprises:
transmitter circuitry that processes transmitter signals; and
receiver circuitry that processes receiver signals, and
the several different signal processing functions include an echo canceller function and a feedback equalizer function;
when the transceiver transmits signals, the equalizer is configured to receive an input signal from the transmitter circuitry to support the echo canceller function; and
when the transceiver does not transmit signals, the equalizer is configured to receive an input signal from the receiver circuitry to support the feedback equalizer function.

12. The invention of claim 11, wherein one of the functions is performed during intervals when the transceiver transmits signals, and another of the functions is performed during intervals when the transceiver does not transmit signals.

13. The invention of claim 10, wherein the function performed during intervals when the transceiver does not transmit signals includes feedback equalization.

14. The invention of claim 10, wherein the function performed during intervals when the transceiver transmits signals includes echo cancellation and/or collision detection.

15. A method of operating a data communication transceiver, the transceiver comprising transmitter circuitry that processes transmitter signals and receiver circuitry that processes received signals, the transceiver comprising an equalizer, comprising the steps of selectively:
(a) operating the equalizer in an echo canceller when the transceiver is transmitting signals; and
(b) operating the equalizer in a feedback equalizer when the transceiver is not transmitting signals.

16. The invention of claim 15, wherein the equalizer is an adaptive equalizer.

17. The invention of claim 16, wherein the adaptive equalizer includes a filter having tap coefficients C(n) that, when the adaptive equalizer is operating in the echo canceller, are updated in accordance with $$C(n+1)=C(n)+\beta Y(n)S(n-\Delta)$$

where
- $C(n)=[c_1(n) \ldots c_N(n)]^T+j[d_1(n) \ldots d_N(n)]^T$ is a complex coefficient vector of the filter at time n,
- $S(n-\Delta)$ is the complex vector of symbols to be transmitted delayed by Δ symbol periods,
- β is an adaptation step size, and
- Y(n) is the difference between an echo-containing received signal and an estimated echo signal.

18. The invention of claim 16, wherein the receiver circuitry includes a slicer having an input and an output and wherein the adaptive equalizer includes a filter having tap coefficients C(n) that, when the equalizer is operating in the feedback equalizer, are updated in accordance with $$C(n+1)=C(n)+\beta E(n)\hat{A}(n)$$

where
- $C(n)=[c_1(n) \ldots c_N(n)]^T+j[d_1(n) \ldots d_N(n)]^T$ is a complex coefficient vector of the filter at time n,
- $\hat{A}(n)=[\hat{a}(n) \ldots \hat{a}(n-N+1)]^T+j[\hat{b}(n) \ldots \hat{b}(n-N+1)]^T$ is a vector of a sliced complex symbol at the slicer output,
- $E(n)=e_I(n)+je_Q(n)$ is a complex error value between the slicer input and slicer output, and
- β is an adaptation step size.

19. The invention of claim 15, further comprising the step of detecting collisions when the equalizer is operating in the echo canceller.

20. The invention of claim 19, wherein the collision detecting step includes comparing a receiver signal with a reference.

21. The invention of claim 20, wherein the receiver circuitry includes a slicer having an input and an output, the equalizer is an adaptive equalizer that includes a filter having tap coefficients C(n) that, when the adaptive equalizer is operating in the echo canceller, are updated in accordance with $$C(n+1)=C(n)+\beta Y(n)S(n-\Delta)$$

where $C(n)=[c_1(n) \ldots c_N(n)]^T+j[d_1(n) \ldots d_N(n)]^T$ is a complex coefficient vector of the filter at time n, $S(n-\Delta)$ is the complex vector of symbols to be transmitted delayed by $\Delta$ symbol periods, $\beta$ is an adaptation step size, and $Y(n)$ is the difference between an echo-containing received signal and an estimated echo signal, and, when the equalizer is operating in the feedback equalizer, are updated in accordance with $$C(n+1)=C(n)+\beta E(n)\hat{A}(n)$$

where $C(n)=[c_1(n) \ldots c_N(n)]^T+j[d_1(n) \ldots d_N(n)]^T$ is a complex coefficient vector of the filter at time n, $\hat{A}(n)=[\hat{a}(n) \ldots \hat{a}(n-N+1)]^T+j[\hat{b}(n) \ldots \hat{b}(n-N+1)]^T$ is a vector of a sliced complex symbol at the slicer output, $E(n)=e_I(n)+je_Q(n)$ is a complex error value between the slicer input and slicer output, and $\beta$ is an adaptation step size.

22. The invention of claim 15, wherein:

when the transceiver is transmitting signals, the equalizer receives an input signal from the transmitter circuitry to operate in the echo canceller; and when the transceiver is not transmitting signals, the equalizer receives an input signal from the receiver circuitry to operate in the feedback equalizer.

* * * * *